US011926299B2

(12) United States Patent
Svensson

(10) Patent No.: US 11,926,299 B2
(45) Date of Patent: Mar. 12, 2024

(54) SYSTEM AND METHOD FOR PREDICTING ROAD COLLISIONS WITH A HOST VEHICLE

(71) Applicant: Aptiv Technologies Limited, St. Michael (BB)

(72) Inventor: Viktor Svensson, Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 309 days.

(21) Appl. No.: 17/518,462

(22) Filed: Nov. 3, 2021

(65) Prior Publication Data
US 2022/0161767 A1    May 26, 2022

(30) Foreign Application Priority Data
Nov. 23, 2020  (EP) .................................... 20209229

(51) Int. Cl.
*B60T 7/12* (2006.01)
*B60K 31/00* (2006.01)
*B60Q 9/00* (2006.01)

(52) U.S. Cl.
CPC ............ *B60T 7/12* (2013.01); *B60K 31/0008* (2013.01); *B60Q 9/008* (2013.01); *B60T 2210/32* (2013.01)

(58) Field of Classification Search
CPC ....... B60T 7/12; B60T 2210/32; B60Q 9/008; B60K 31/0008; B60K 2031/0016; B60K 2031/0025; B60K 2031/0033; B60K 2031/0041; B60K 2031/005
See application file for complete search history.

(56) References Cited

U.S. PATENT DOCUMENTS

| 10,118,610 | B2 | 11/2018 | Deng et al. |
| 2008/0303696 | A1* | 12/2008 | Aso .................. G08G 1/161 340/933 |
| 2019/0243371 | A1 | 8/2019 | Nister et al. |
| 2019/0250622 | A1 | 8/2019 | Nister et al. |
| 2020/0339116 | A1 | 10/2020 | Xu et al. |

FOREIGN PATENT DOCUMENTS

| CN | 110264721 | 9/2019 |
| DE | 102013019202 | 8/2016 |
| JP | 2019167039 | 10/2019 |

OTHER PUBLICATIONS

"Extended European Search Report", EP Application No. 20209229.2, dated May 6, 2021, 8 pages.
Brännström, et al., "Decision-making on when to brake and when to steer to avoid a collision", Jan. 2014, pp. 131-146.

* cited by examiner

*Primary Examiner* — Jacob M Amick
(74) *Attorney, Agent, or Firm* — Harness, Dickey & Pierce, P.L.C.

(57) ABSTRACT

Described are systems and methods for predicting road collisions between a host vehicle and one or more objects in the surroundings of the vehicle. In aspects, range rate and heading information is acquired regarding a moving object in the surroundings of the vehicle; possible vehicle trajectories of the vehicle are calculated; possible object trajectories are calculated from the range rate of the object, the heading of the object, and a possible turn and acceleration of the object; and a collision calculation is performed.

20 Claims, 8 Drawing Sheets

SYSTEM AND METHOD FOR PREDICTING ROAD COLLISIONS WITH A HOST VEHICLE

CROSS-REFERENCE TO RELATED APPLICATION

This application claims priority to European Patent Application Number 20209229.2, filed Nov. 23, 2020, the disclosure of which is hereby incorporated by reference in its entirety herein.

BACKGROUND

Driver assistance systems may be provided with vehicles in order to improve driver safety, and in order to provide autonomous or semi-autonomous operation of the vehicle.

Such driver assistance systems comprise one or more sensing systems mounted on the vehicle which are configured to sense the surroundings of the vehicle and to provide information about the objects surrounding the vehicle (for example other vehicles or road users) such as position, velocity, and even classification of the object by type.

Driver assistance systems may be employed to assist the driver in avoiding collisions. Once example of a collision-mitigation function provided by a driver assistance system is a forward collision-mitigation function, in which the driver assistance system detects the presence of an object in the forward direction of travel of the vehicle and actuates braking of the vehicle if it is determined that a collision is likely. Such functions typically perform a time to collision (TTC) calculation to determine whether a collision is likely.

However, such collision-mitigation functions are only suitable for predicting collisions in a subset of possible collision scenarios. For example, collision scenarios in which both the host vehicle and the object have dynamic speeds, accelerations, headings and curvatures cannot be accurately modelled by a forward collision-mitigation function.

There is therefore a desire to provide a driver assistance system which can accurately predict likely collisions in a wider range of scenarios.

On the other hand, a driver assistance system which monitors a wide range of collision scenarios may be prone to false intervention (i.e. activating the collision-mitigation function when a collision is unlikely) due to the broader range of objects that are to be monitored.

Accordingly, there is a desire to provide a driver assistance system which triggers a collision-mitigation system in a reliable and accurate manner which is not a nuisance to the driver.

SUMMARY

This disclosure relates to a method for predicting collisions between a host vehicle and one or more objects in the surroundings of the vehicle, particularly a road vehicle, and a vehicle comprising an apparatus for performing the method.

According to a first aspect, there is provided a computer-implemented method for predicting collisions between a vehicle and one or more objects in the surroundings of the vehicle, comprising: a) acquiring information about one or more moving objects in the surroundings of the vehicle, the information comprising at least a range rate and a heading of each of the one or more objects in the surroundings of the vehicle; b) calculating one or more possible vehicle trajectories of the vehicle; c) for each object, calculating a plurality of possible object trajectories of the object from the range rate of the object, the heading of the object and a possible turn and acceleration of the object, the possible turn and/or acceleration values differing for each possible object trajectory and bound by a predetermined first confidence interval for the values; d) for each combination of calculated vehicle trajectory and object trajectory, performing a collision calculation to calculate whether the vehicle and object are to be (e.g., will be) closer than a predetermined minimum distance to each other; and e) determining if, for one or more of the objects, at least a predetermined number of collision calculations indicate the vehicle and object are to be closer than the predetermined minimum distance to each other.

The plurality of possible object trajectories may include: a fast leftward trajectory wherein the object travels leftward of its expected trajectory in a left-most and fastest scenario in the first confidence interval; a slow leftward trajectory wherein the object travels leftward of its expected trajectory in a left-most and slowest scenario in the first confidence interval; a fast rightward trajectory wherein the object travels rightward of its expected trajectory in a right-most and fastest scenario in the first confidence interval; and a slow rightward trajectory wherein the object travels rightward of its expected trajectory in a right-most and slowest scenario in the first confidence interval.

The one or more possible vehicle trajectories may include a leftward trajectory wherein the vehicle is steered leftward of its expected trajectory and a rightward trajectory wherein the vehicle is steered rightward of its expected trajectory, wherein the leftward and rightward trajectories represent a confidence interval of the vehicle trajectory.

The predetermined number of collision calculations may be all of the collision calculations for the object.

The information about the one or more objects may include a classification of the object, wherein: the plurality of possible object trajectories calculated are calculated based in part on the object classification; and/or the predetermined distance is selected based on the object classification.

The method may additionally comprise: f) initiating a collision-mitigation process if, for one or more of the objects, a predetermined number of collision calculations indicate the vehicle and object are to be closer than the predetermined minimum distance to each other; optionally wherein the first collision-mitigation process is selected from: issuing a collision warning to the driver of the vehicle; initiating a brake assist process; initiating a pre-brake process; and initiating an emergency braking process.

The method may repeat the process of steps c) to f) one or more times iteratively, each iteration performed only if the collision-mitigation process of the previous iteration is initiated. Each iteration may calculate a plurality of object trajectories having turn and acceleration values lying within a confidence interval greater than the confidence interval of the previous iteration, and a collision-mitigation process of the iteration may be initiated if, for one or more of the objects, at least a predetermined number of collision calculations indicate the vehicle and object are to be closer than the predetermined minimum distance to each other.

The above may comprise three iterations wherein: the collision-mitigation process of the first iteration is issuing a collision warning to the driver of the vehicle; the collision-mitigation process of the second iteration is initiating a brake assist process and/or initiating a pre-brake process; and the collision-mitigation process of the third iteration is initiating an emergency braking process.

Prior to initiating one or more collision-mitigation processes, the method may comprise: f) calculating a braking vehicle trajectory modelling a scenario in which the vehicle maintains the curvature of the expected vehicle trajectory and brakes; g) for the braking vehicle trajectory and each of one or more object trajectories, performing a collision calculation to calculate whether the vehicle and object are to be closer than the predetermined minimum distance to each other; and h) only if so, initiating the collision-mitigation process.

Prior to step c), the method may comprise, for each object, calculating an expected trajectory of the object from the acquired information and an expected trajectory of the vehicle and determining whether the expected trajectories overlap; and wherein step c) is only performed for those objects whose expected trajectory crosses the expected trajectory of the vehicle.

The method may further comprise performing a preliminary collision calculation to calculate whether the vehicle and object are to be closer than a predetermined minimum distance to each other along their expected trajectories; wherein step c) is only performed for those objects that are predicted to be closer than the predetermined distance to the vehicle in the preliminary collision calculation.

The preliminary collision calculation may comprise: calculating bounding boxes for the vehicle and object, the bounding boxes containing the vehicle and object, respectively; calculating the longitudinal distance between the centers of the bounding boxes at one or more time instances; calculating the lateral distance between the centers of the bounding boxes at the one or more time instances; and when the longitudinal distance and lateral distance indicate that the bounding boxes are, or may theoretically be, closer than the predetermined minimum distance, determining whether the bounding boxes are closer than the predetermined minimum distance.

The collision calculation may comprise: calculating bounding boxes for the vehicle and object, the bounding boxes containing the vehicle and object, respectively; calculating the longitudinal distance between the centers of the bounding boxes at one or more time instances; calculating the lateral distance between the centers of the bounding boxes at the one or more time instances; and when the longitudinal distance and lateral distance indicate that the bounding boxes are, or may theoretically be, closer than the predetermined minimum distance, determining whether the bounding boxes are closer than the predetermined minimum distance.

According to a second aspect, there is provided a computer program comprising computer-readable instructions which, when executed by a processor, cause the processor to execute a method according to the first aspect.

According to a third aspect, there is provided a driver assistance system for a vehicle configured to perform the method according to the first aspect.

BRIEF DESCRIPTION OF THE DRAWINGS

Embodiments will now be explained in detail, by way of non-limiting example only, with reference to the accompanying figures described below.

DETAILED DESCRIPTION

Figure 1A:
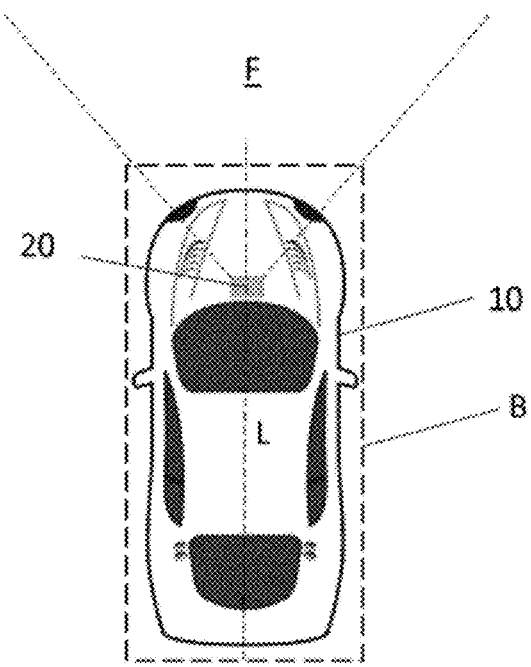
FIG. 1A shows a vehicle equipped with an advanced driver assistance system (ADAS) according to one or more embodiments.

FIG. 1A shows a vehicle 10 equipped with an advanced driver assistance system (ADAS) 20 according to one or more embodiments of the present disclosure. The ADAS 20 may have various components mounted on the vehicle 10 at different locations, but for the sake of simplicity the ADAS 20 is depicted as a single component mounted on the vehicle. The ADAS 20 includes one or more sensors for sensing objects in the surroundings of the vehicle 10. For example, the ADAS 20 includes one or more radar sensors, lidar sensors, ultrasonic sensors and/or imaging sensors for detecting objects in the surroundings of the vehicle 10. The ADAS 20 is configured to detect at least a range, range rate and a heading of objects in the surroundings of the vehicle. These values indicate the position, speed and direction of travel of the objects relative to the vehicle.

In the ADAS 20, the sensors are mounted on the vehicle 10 such that they are able to sense objects within a field of view F of the vehicle surroundings. For example, sensors may be mounted at the front corners of the vehicle 10.

Figure 1B:
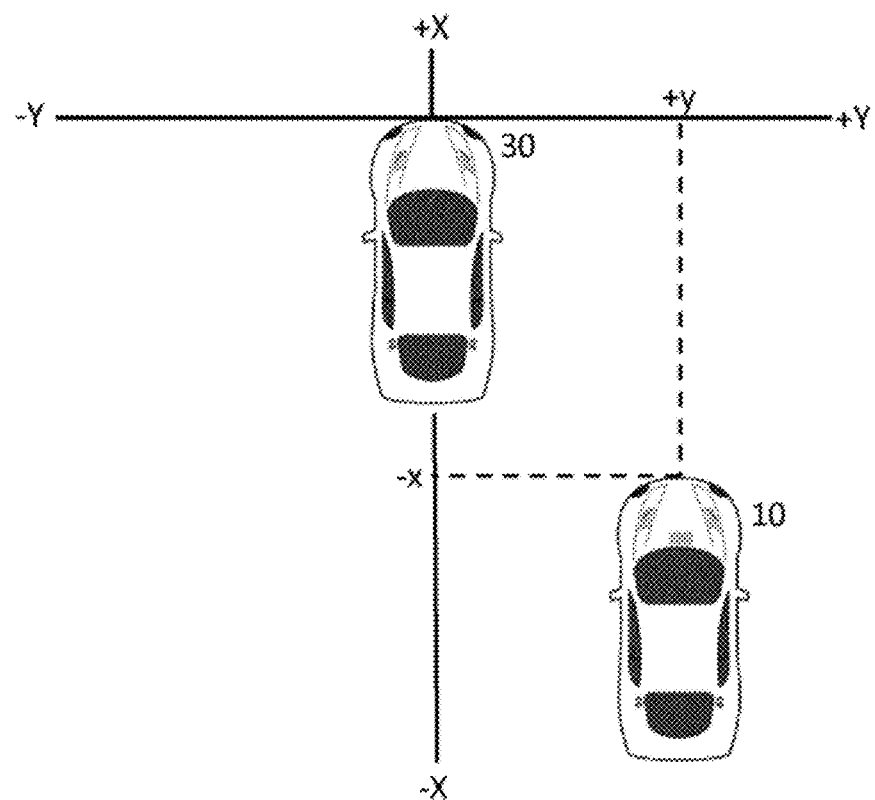
FIG. 1B shows a vehicle coordinate system of the vehicle shown in FIG. 1A.

FIG. 1B shows the vehicle coordinate system (VCS) of the vehicle 10, although it will be appreciated that other vehicle coordinate systems may be selected without departing from the scope of this disclosure. The origin of the VCS is taken at the center of the front bumper of the vehicle 10. The ADAS 20 is calibrated to report object measurements in Cartesian coordinates located on straight-line X (longitudinal) and Y (lateral) axes. The X direction is taken to be the direction of normal, straight, forward travel of the vehicle 10, and the Y direction is perpendicular to the X direction and parallel to the ground (assuming the vehicle is on a flat ground). Positive x-values extends forward from the y-axis origin and positive y-values extend right of the x-axis origin, when the VCS is viewed in plan as shown in FIG. 1B.

Figure 1C:
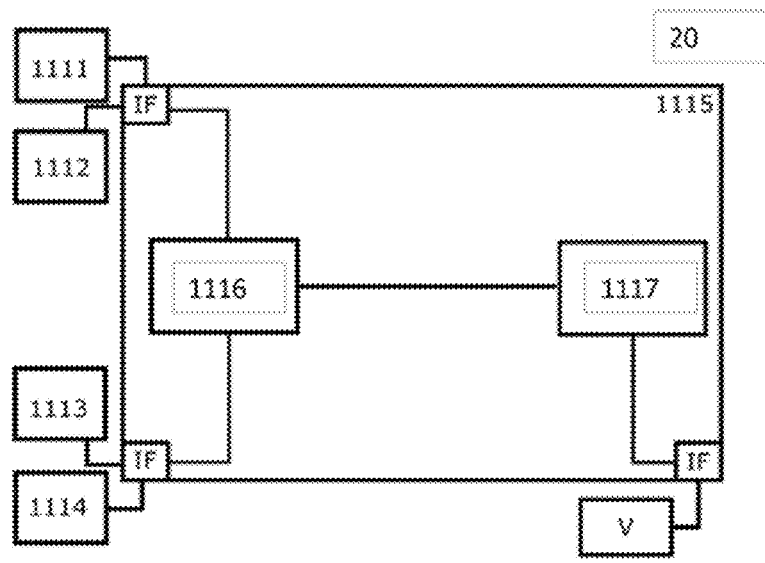
FIG. 1C shows a schematic block diagram of an ADAS which may be used to implement the methods disclosed herein.

FIG. 1C shows a schematic block diagram of an ADAS 20 which may be used to implement any of the methods disclosed herein, although it will be appreciated that other ADASs which are configured to detect objects in the surroundings of a vehicle may be configured to perform the methods disclosed herein.

ADAS 20 includes cameras 1111, 1112 and radar sensors 1113, 1114 (which may instead be lidar sensors or ultrasonic sensors), which are connected to controller 1115 via interface connectors IF. The field of view of the cameras may at least partially overlap with the field of view of the sensors. The relative orientations of the cameras and sensors are calibrated such that a point in the field of view of a camera or sensor can be readily transformed to a point in the field of view of another camera or sensor (e.g. by fusion module 1116). It will be appreciated than in other embodiments, the ADAS may include only cameras 1111, 1112 or radar sensors 1113, 1114.

Radar sensors 1113 and 1114 are mounted, for example, respectively at front corners of the vehicle, on opposite sides of a vehicle longitudinal centerline L, in mirror-image positions across this centerline. Longitudinal centerline L may be regarded as the direction that the vehicle travels in normal, straight forward motion, and typically defines an overall plane of reflective symmetry of the vehicle 10.

Each radar sensor 1113, 1114 transmits, for example, continuous-wave (CW) or pulsed radio or microwave radiation with an angular distribution centered around a facing direction of the radar sensor. Radar sensor 1113, 1114 also receives reflected or scattered radio or microwave radiation from the environment, for example reflected or scattered by objects which the radar sensor faces. Based on the radiation received, the radar sensor may return information representing the range and bearing relative to the radar sensor of one or more objects in the environment, which information is typically referred to as one or more radar tracks. In practice, extended objects in the environment tend to return multiple signals, from which the scale of the object can also be derived.

Additionally, radar sensors 1113, 1114 may have the capability to measure the movement of the one or more objects, including relative velocity of the object or objects in a direction across or along the direction from the sensor to the object, for example by Doppler shift measurement.

The ADAS 20 may also be configured to calculate the heading and acceleration of objects, for example by comparing the range and bearing of two or more measurements taken at different times.

Each radar sensor 1113, 1114 is characterized by a horizontal field of view which typically extends an equal angular amount in horizontal azimuth either side of the facing direction of the sensor. It will be appreciated that the horizontal azimuth of each sensor can be selected according to the application (for example may be 90, 120 or 150 degrees). Further, any number of radar sensors may be arranged about the vehicle such that the collective field of view F of the ADAS may be selected to be any suitable value.

Although each radar sensor is also characterized by a vertical field of view, beyond that such a field of view should be sufficiently restricted to avoid unwanted reflections from the ground surface or objects above the height of the vehicle, the vertical field of view is not further discussed.

Moreover, each radar sensor 1113, 1114 is characterized by a detection range, which may be determined by the power of the radar signal emitted by the sensor and the detection sensitivity of the sensor. The range of each sensor may be at least 150 meters, optionally 200 meters.

Finally, each radar sensor 1113, 1114 is characterized by an angular discrimination, which is the angular separation of objects which can be resolved by the sensor. Typically, the angular discrimination of a radar sensor decreases for objects at azimuthal positions away from the facing direction of the sensor, and so radar sensors are typically characterized in terms of angular discrimination for objects lying on a line extending in the facing direction. The angular discrimination of each radar sensor may be at least 4 degrees.

It is noted that the individual fields of view of the radar sensors may have a region of overlap depending on their mounting configuration on the vehicle 10.

The radar sensors may operate, for example, in a frequency band of 76 gigahertz to 81 gigahertz.

The signals from cameras 1111 and 1112 and the signals from radar sensors 1113 and 1114 are supplied to fusion module 1116, which processes the signals to identify objects in the environment of the vehicle, using known object detection algorithms.

For example, fusion module 1116 may receive signals from radar sensor 1113 or 1114 indicating the presence of an object at a certain range and azimuth relative to the facing direction of that sensor and may, by trigonometry, identify an object as being located at a position relative to the vehicle which corresponds to that range and azimuth. To allow such a determination, fusion module may be provided with configuration information representing the position and facing direction of the sensors.

If the radar sensors have overlapping fields of view, when fusion module 1116 receives signals from radar sensors 1113 and 1114 indicating the presence of an object at a certain range and azimuth relative to each of the facing directions of those sensors, such that the object lies in the region of overlap, the fusion module 1116 performs a sensor fusion operation on the signals and identifies a single object as being located at a position in the region of overlap.

By providing radar sensors 1113 and 1114 angled with the facing direction away from the longitudinal centerline L of vehicle 10, accurate detection of objects approaching the direction of travel of vehicle 10 from a position away from the centerline of the vehicle can be achieved by making use of the good angular discrimination of radar sensors 1113 and 114 at angles close to the facing direction of each radar sensor.

In embodiments where the ADAS 20 includes only cameras, objects may be detected using any suitable stereo algorithm on a pair of overlapping images taken by the cameras.

Information about the position of objects in the environment around vehicle 10 is received from fusion module 1116 by decision module 1117. Decision module 1117 implements a decision engine which, based on the information about the position of objects in the environment around vehicle 10, issues commands via a suitable interface IF to vehicle systems, represented by vehicle controller V. Access to vehicle controller V can, for example, be provided by a common interface bus interfaced to discrete controllers for acceleration, braking, steering, and the like, or can be provided by a single vehicle controller controlling all or a subset of these functions.

Further, for objects which are determined to be in the field of view of the cameras (either by the radar sensors 1111, 1112 or via a stereo algorithm performed on the image data of the cameras by the fusion module 1116), object-recognition and image-processing algorithms may be performed by fusion module 1116 on the signals received from cameras 1111 and 1112 to identify and locate the object in the field of view of cameras 1111 and 1112. Fusion module 1116 may then provide information about the position and movement of object to decision module 1117 in the same way as for information about the position of movement of the object based on signals from sensors 1113 and 1114. The image-processing algorithms may also be adapted to provide a classification for the object based on the image data received by the cameras 1111 and 1112 using known object classification methods, for example using a trained machine learning algorithm or any other suitable algorithm. For example, the fusion module 1116 may be configured to analyze the image data to classify the detected object as one or more of: car; motorcycle; truck; pedestrian; pole; tree; animal; general on-road object; bicycle; unidentified vehicle.

The fusion module 1116 may further be configured to calculate an estimate of acceleration of the object from the sensor data.

Decision module 1117 may be adapted to perform any of the collision-prediction methods disclosed herein. As a result of the collision-prediction method, the decision module may be configured to implement a collision-mitigation process by issuing commands to one or more vehicle components. As used herein, the term "collision-mitigation process" may be any autonomous process which assists the driver of a vehicle in avoiding a collision or which mitigates the impact of a collision. Examples of collision-mitigation processes include: issuing a collision warning to the driver of the vehicle; initiating a brake assist process; initiating a pre-brake process; and initiating an emergency braking process.

As used herein, a "brake assist process" means a process that modifies the braking function of the vehicle so that an increased braking force is applied for a given brake input by the driver. A "pre-brake process" means a process that pre-charges the brakes before a driver applies the brakes (e.g. a process that autonomously starts the brake motor to build up braking pressure). This results in a fast braking response when emergency braking is triggered.

Figure 2:
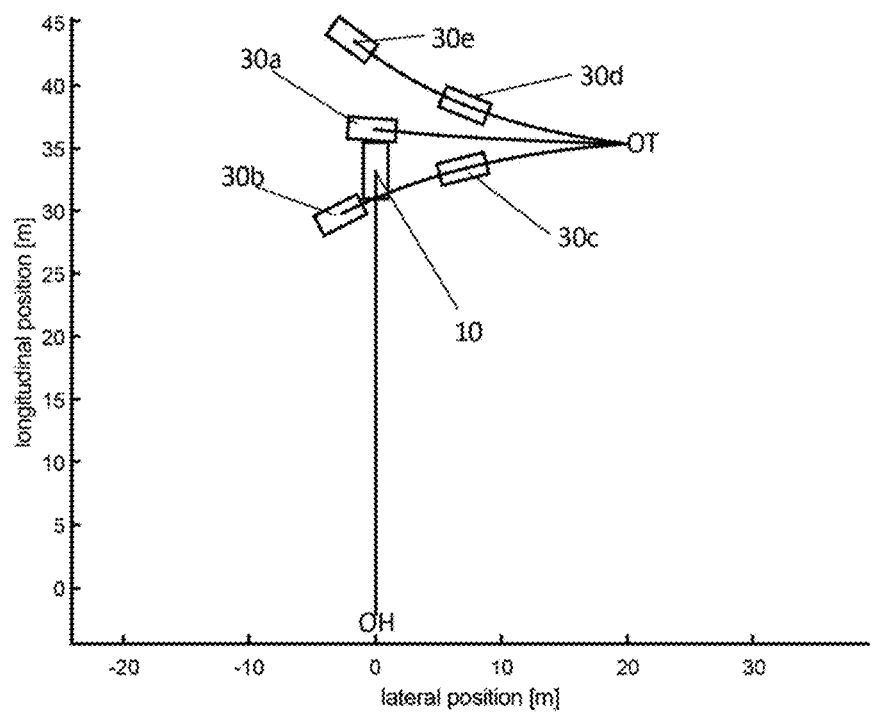
FIG. 2 shows a representation of possible scenarios between a vehicle and a moving object.

FIG. 2 shows a representation of possible scenarios between vehicle 10 and a moving object 30 (e.g. vehicle) detected by ADAS 20. The scenarios illustrated are shown in the Earth's frame of reference and not the VCS. The scenarios may be modelled by decision module 1117 using data received from the fusion module 1116. The object 30 is detected at a position OT by the ADAS 20 when the vehicle 10 is at a position OH, at a start time. For the sake of simplicity, it is assumed that the vehicle 10 is moving along as straight line at constant velocity.

The position of the vehicle 10 is extrapolated in time along a trajectory, using the velocity and direction of the vehicle 10, as is the object 30 in a plurality of scenarios wherein the object 30 takes different trajectories. The plurality of scenarios is taken from the detected range, range rate and heading of the object 30 by the ADAS 20, additionally taking into account the possible behavior of the object 30 (i.e. by accurately modelling the possible behavior of the object 30). For example, if the object 30 is a vehicle, the driver of the vehicle 30 may accelerate, brake, turn left or turn right. The amount of acceleration, deceleration and turning can be modelled statistically such that for a given object 30, certain maximum/minimum values for acceleration, deceleration and turning can be predetermined within a confidence interval, by determining confidence intervals from observed statistical data of vehicle behavior. A confidence interval has an associated confidence level that the true parameter is in the proposed range. For example, a confidence interval of 90% indicates that there is an estimated 90% confidence that the true value is within the confidence interval. For example, the expected values and standard deviation of acceleration (or deceleration) and turn of a vehicle can be determined from observed vehicle behavior (e.g. observed data about vehicle acceleration and turn). The observed vehicle behavior may be grouped by object type and speed. For example, the range of turning that a vehicle may perform at a high speed may be less than at a lower speed. Likewise, the range of acceleration of a truck may be smaller than the range of acceleration of a motorcycle. The confidence interval selected may be, for example, 1 standard deviation (68%), 1.5 standard deviations (80%), or 2 standard deviations (95%) based on the statistical data.

In a first scenario (30*a*), the object 30 also continues along its current expected trajectory at a constant velocity, which results in a collision at the end of the modelled trajectories. Likewise, in another scenario (30*b*), the object 30 accelerates and turns left of its current trajectory, which results in a collision. However, in other scenarios (30*c*, "brake left"; 30*d*, "brake right"; 30*e* "accelerate right") the object 30 and the vehicle do not collide.

Accordingly, out of the modelled scenarios, there are more scenarios in which a collision does not occur than those in which a collision does occur. It may therefore not be desirable to initiate a process which warns the driver of the vehicle 10 or which autonomously operates vehicle functions, as it may be triggered in instances where the collision is avoided by the driver of the vehicle 10 and the object 30. Accordingly, it is advantageous to perform a plurality of collision calculations for different scenarios in which the behavior of the object 30 is within a confidence interval, and only activating a collision-mitigation process if a predetermined number of the collision calculations results in a collision. It is noted that "collision" is taken to mean a result of the collision calculation indicating that the vehicle 10 and the object 30 will be within a predetermined distance (i.e. a safety margin) at some point along their trajectories in a given scenario.

Figure 3:
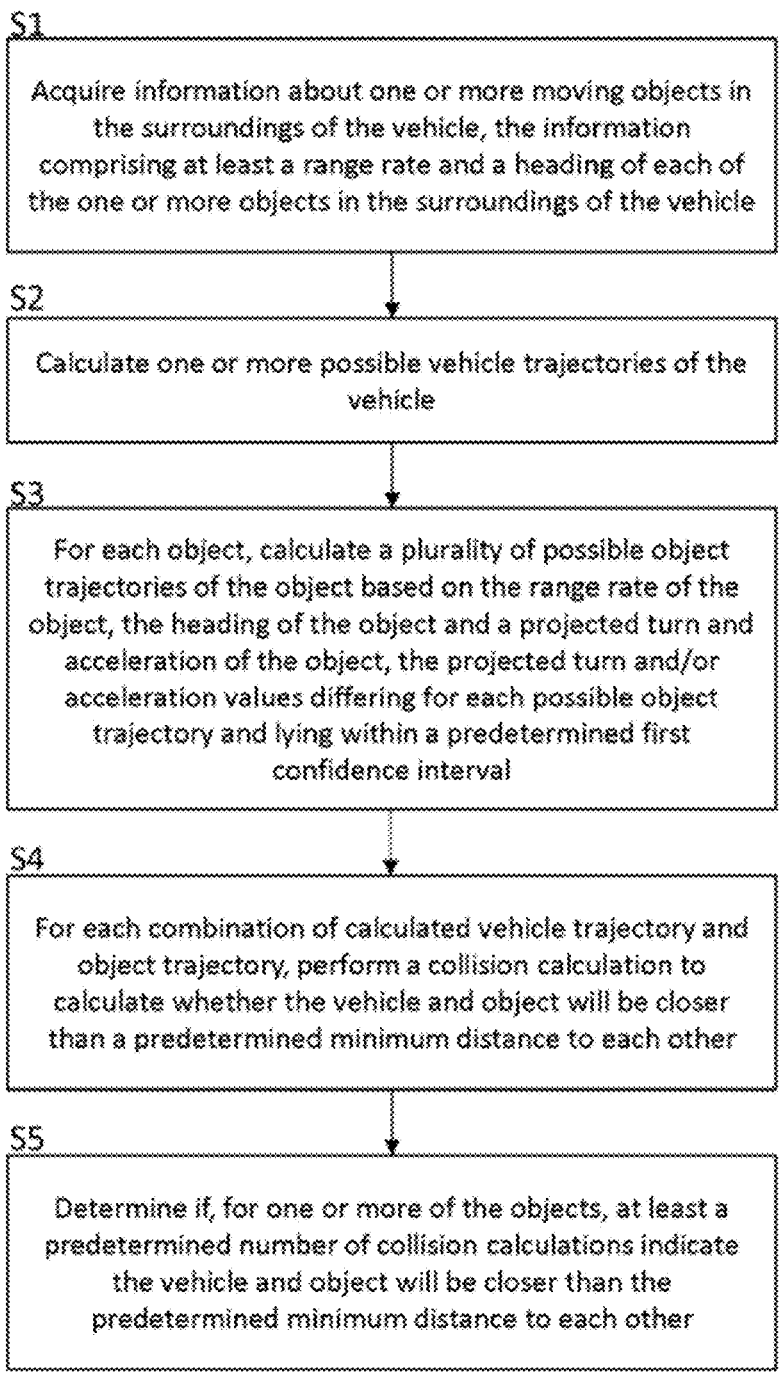
FIG. 3 shows a method for predicting collisions according to one or more embodiments.

FIG. 3 shows a method 100 for predicting collisions between a host vehicle (i.e. vehicle 10) and one or more objects in the surroundings of the vehicle.

In step S1, information is acquired about one or more moving objects in the surroundings of the vehicle, the information comprising at least a range rate and a heading of each of the one or more objects in the surroundings of the vehicle. For example, the information may be obtained from the ADAS 20 disclosed above to obtain the range, range rate and heading of the objects (the position, speed, and direction of travel of the objects). As noted above, the surroundings which may be detected by the ADAS may be all of the surroundings of the vehicle or only a part of the surroundings.

Figure 4:
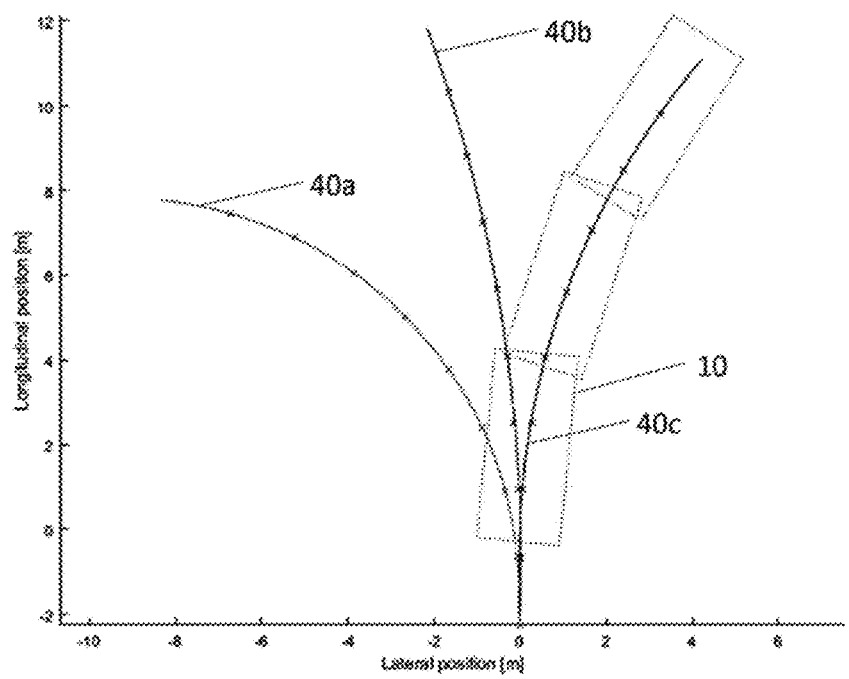
FIG. 4 shows a plurality of possible trajectories of a vehicle.

In step S2, one or more possible vehicle trajectories of the vehicle are calculated (e.g. relative to earth). This may be calculated by the decision module 1117 based on data received from the fusion module 1116 or from one or more other components of the vehicle (for example a speedometer, accelerometer, and steering wheel angle). For example, the decision module 1117 may receive data representing the velocity, acceleration and turn rate of the vehicle from the fusion module 1116 or various vehicle components, and may calculate a current (expected) trajectory of the vehicle based upon this information in which the turn rate of the vehicle remains constant. The current trajectory of the vehicle can be calculated using a Constant Turn, Constant Acceleration (CTCA) model wherein the turn and acceleration are kept constant and may be computed by any suitable numerical iterative method. Alternatively, the projected turn and acceleration may be dynamic parameters defined by yaw acceleration and jerk. The decision module 1117 may additionally receive data representing the jerk of the vehicle to include in the trajectory calculation of the vehicle. Any suitable method of extrapolating the trajectory of the vehicle may be used. The one or more possible vehicle trajectories may include the current trajectory of the vehicle, and/or may include a plurality of possible vehicle trajectories which take into account changes in turn due to the steering behavior of the driver of the vehicle. In other words, the one or more possible vehicle trajectories may include a leftward trajectory wherein the driver turns the vehicle leftward of its current trajectory, and a rightward trajectory wherein the driver turns the vehicle rightward of its current trajectory. These trajectories may be modelled in using similar methods as the current trajectory, additionally modelling a constant yaw acceleration. The leftward and rightward trajectories may represent the bounds of a confidence interval for possible trajectories of the vehicle (i.e. the left-most and right-most trajectories which are at the bounds confidence interval). The variation in steering of the driver can be modelled statistically (i.e. confidence intervals for the projected turn of the vehicle can be based on statistical data from previously observed driving behavior, either of the particular driver or from previously compiled driver data, and additionally including any error margins of values received by the decision module 1117). The leftward and rightward trajectories can be calculated from the confidence intervals for the projected turn of the vehicle, by selecting the left-most yaw acceleration and right-most yaw accelerations defining the confidence interval for yaw acceleration, and performing nonlinear modelling (unscented prediction) on the input parameters. FIG. 4 shows, a current trajectory 40b generated by a CTCA model using the current turn and acceleration of the vehicle 10, and a leftward trajectory 40a and rightward trajectory 40c of the vehicle 10.

In step S3, for each object detected by the ADAS 20, a plurality of possible object trajectories of the object are calculated based on the range rate of the object, the heading of the object (the position, range rate and heading of the object obtained from the sensors of the ADAS 20) and a possible turn and acceleration of the object, the possible turn and/or acceleration differing for each possible object trajectory and bound by a predetermined first confidence interval for the values (calculated in the same reference frame as the vehicle trajectories). As in the case of the vehicle trajectories, the confidence interval may be defined by both measurement uncertainties of the object detected by the sensors, and uncertainty in the possible behavior of the object (i.e. the statistical range of likely behavior). In particular, the uncertainties include: uncertainty of position, speed, tangential acceleration and heading reported from the fusion module 1116; turning hypothesis depending on the object speed and object type (i.e. the amount by which an object at a particular speed would be expected to turn left or right, which may differ for each object type); and acceleration and deceleration predictions of the object depending upon object type (i.e. the amount by which the object may accelerate or decelerate, which may differ depending on the object type). The possible object trajectories may be calculated using the methods described above in step S2.

In step S4, for each combination of calculated vehicle trajectory and object trajectory, a collision calculation is performed to calculate whether the vehicle and object are to be (e.g., will be) closer than a predetermined minimum distance to each other (i.e. whether at some point along their trajectories, any part of the vehicle is closer than the minimum distance to any part of the object). The predetermined distance can be selected based on the safety margin between the vehicle and the object that must be maintained. It is noted that in embodiments where the fusion module 1116 classifies the object by type, the predetermined minimum distance may vary depending on the object type. For example, the predetermined minimum distance may be greater for more vulnerable road users (such as bicycles or pedestrians) than, for example, cars or trucks. The predetermined distance may also depend on the vehicle speed, increasing with the vehicle speed, assuming that a larger safety margin is preferred at higher vehicle speeds. As an example, the predetermined distance may be between 0.6 m to 1 m for vulnerable road users and may be between 0.3 m to 0.6 m for other vehicles. The predetermined distance may increase linearly from the minimum value at a vehicle speed of 0 kph to the maximum value at a vehicle speed such as 75 kph, above which the maximum value is taken. Any suitable method for determining a collision may be performed. For example, the vehicle and object may be modelled as rectangular bounding boxes which completely contain the vehicle and object, respectively, for example the bounding box B shown in FIG. 1A (e.g. respective rectangles which encompass the vehicle and all of the measurement points of the object). The positions and orientations of the bounding boxes may be iteratively calculated along the trajectories at each time step in the iteration (i.e. using Newton's method, taking the values of curve, tangential velocity, acceleration and jerk as input values), and at each iteration it may be calculated whether the bounding boxes are closer than a predetermined distance, and if so, return a positive result for the collision calculation. For the sake of completeness, it is noted that the term "collision" used herein means that two objects are within a predetermined distance to each other and does not necessarily mean that the two objects make physical contact.

In step S5, it is determined if, for one or more of the objects, at least a predetermined number of collision calculations indicate the vehicle and object are to be closer than the predetermined minimum distance to each other. As each collision calculation is performed for combinations of possible object and vehicle trajectories that are representative of trajectories arising from dynamic variables which are all within a predetermined confidence interval, finding a predetermined number of positive results for the collusion calculation corresponds to a likelihood that a collision is to happen based on typical vehicle/object behavior. The first confidence interval and the required number of positive results may be selected to correspond to a predetermined likelihood that a collision is to happen. The predetermined number of positive results may be all of the collision calculations performed.

Figure 5:
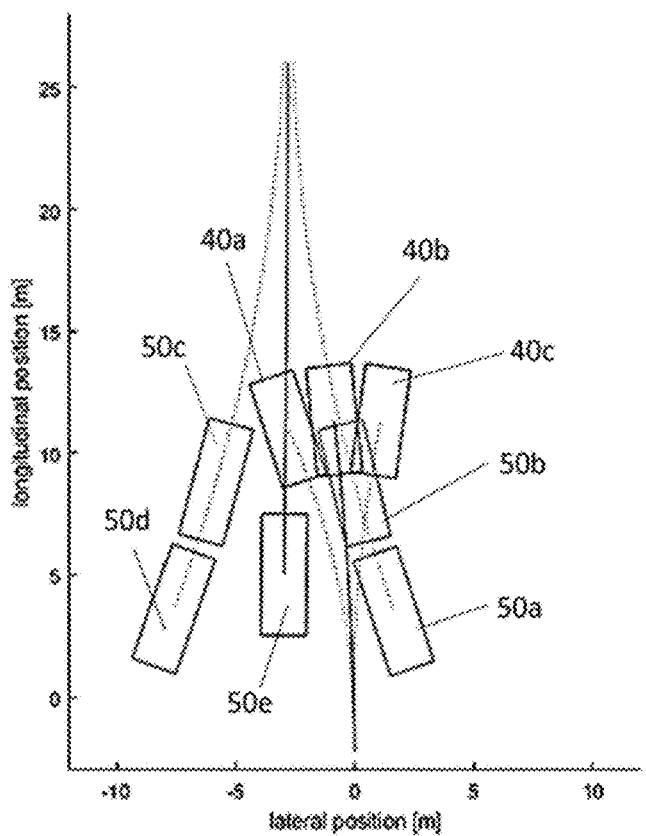
FIG. 5 shows multiple possible trajectories for an object and a vehicle.

FIG. 5 shows multiple possible object trajectories for the vehicle 10 (40a, 40b, 40c) and for the object (50a, 50b, 50c, 50d, 50e). As discussed previously, the vehicle trajectories may include a left-most scenario within the confidence interval (40a) and a right-most scenario within the confidence interval (40a).

The possible object trajectories calculated may include a fast leftward trajectory (50a) wherein the object travels leftward of its current trajectory in a left-most and fastest scenario for the first confidence interval; a slow leftward trajectory (50b) wherein the object travels leftward of its current trajectory in a left-most and slowest scenario for the first confidence interval; a fast rightward trajectory (50d) wherein the object travels rightward of its current trajectory in a right-most and fastest scenario for the first confidence interval; and a slow rightward trajectory (50e) wherein the object travels rightward of its current trajectory in a right-most and slowest scenario for the first confidence interval. The left-most scenarios are the object trajectories using object parameters within the confidence interval which results in the left-most trajectory. The right-most scenarios are the object trajectories using object parameters within the confidence interval which results in the right-most trajectory. The fastest scenarios are the object trajectories using object parameters within the confidence interval which results in the most distance travelled for the object over the trajectory. The fastest scenarios are the object trajectories using object parameters within the confidence interval which results in the most distance travelled for the object over the trajectory. In other words, the object trajectories 50*a-d* show the spatial bounds of possible object trajectories where the first confidence interval is selected for the input parameters of the object's motion. Accordingly, if one or more of the object trajectories 40*a* to 40*d* return a positive result in the collision calculation, there is an indication that a collision is likely for a significant proportion of scenarios. In the case where each of the fast leftward, slow leftward, fast rightward and slow rightward trajectories indicate a collision, this indicates that the confidence interval that a collision is to occur is the first confidence interval (as all trajectories within the bounds of trajectories 40*a* to 40*d* are to also result in a collision). IT follows that no other object trajectories need to be calculated (for example trajectory 50*e*), reducing the computational complexity of predicting the likelihood of a collision.

If a positive result is returned in step S5, a collision-mitigation process may be directly initiated, such as issuing a collision warning to the driver of the vehicle, initiating a brake assist process, initiating a pre-brake process, or initiating an emergency braking process.

Figure 6:
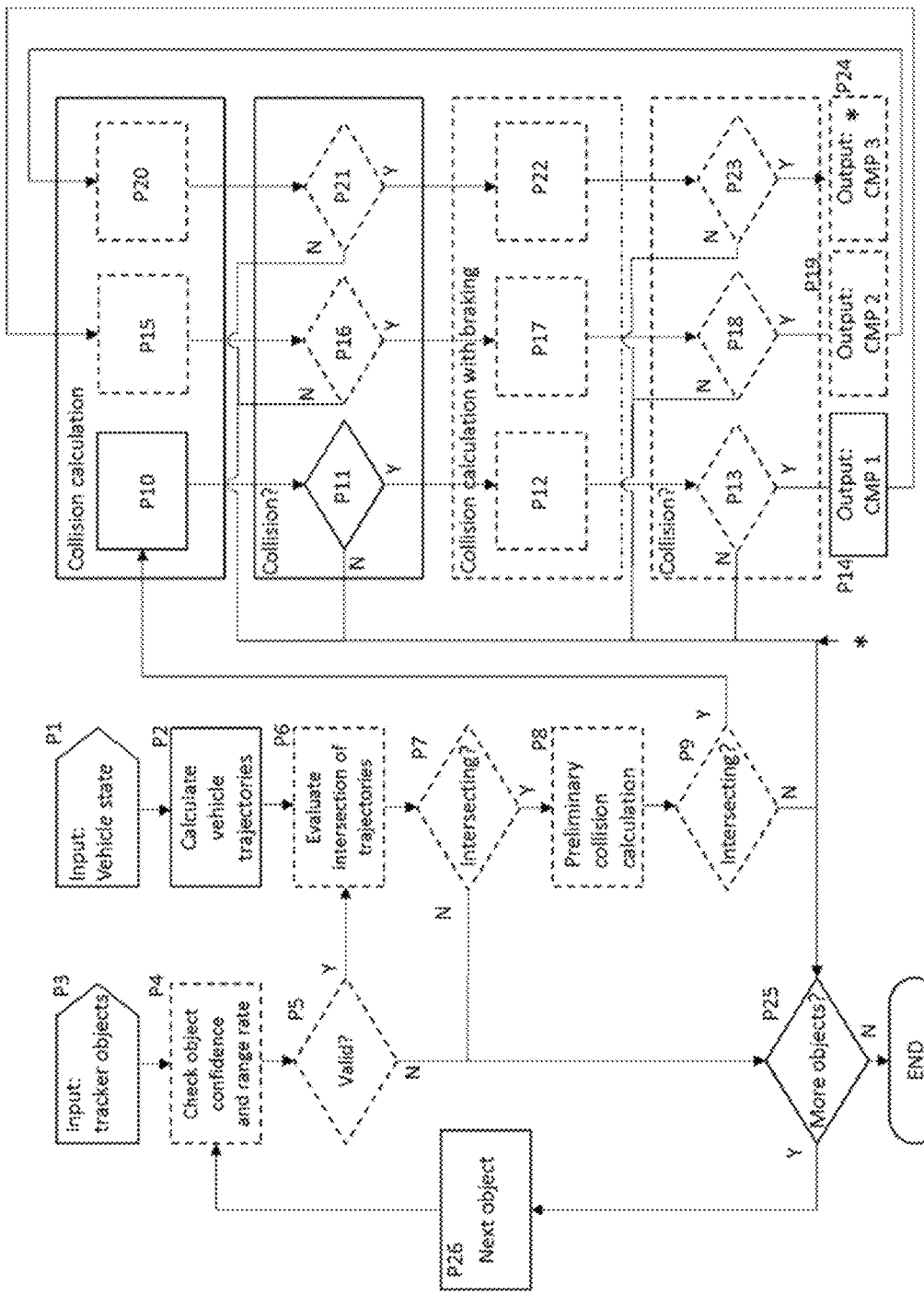
FIG. 6 shows a method for predicting collisions according to one or more embodiments.

FIG. 6 shows a method of predicting a collision according to one or more embodiments of the disclosure.

At step P1, various information regarding the vehicle is received, including, for example, velocity, acceleration and turn rate of the vehicle. Vehicle jerk may also be received.

At step P2, one or more possible vehicle trajectories are calculated, as discussed above.

At step P3, information about one or more moving objects in the surroundings of the vehicle is obtained, the information comprising at least a range rate and a heading of each of the one or more objects.

Optionally, at step P4, the confidence of the object (i.e. the confidence that the sensors of the ADAS are detecting an object) is compared against a minimum threshold, and range rate of the object is checked to see if the object is moving towards the vehicle. If the object confidence is above the minimum threshold and the range rate indicates the object is moving towards the vehicle (P5) then the method proceeds to P6 or P8 or P10. If steps P4 and P5 are not implemented then each object proceeds directly to steps P6, P9 or P10.

Figure 8:
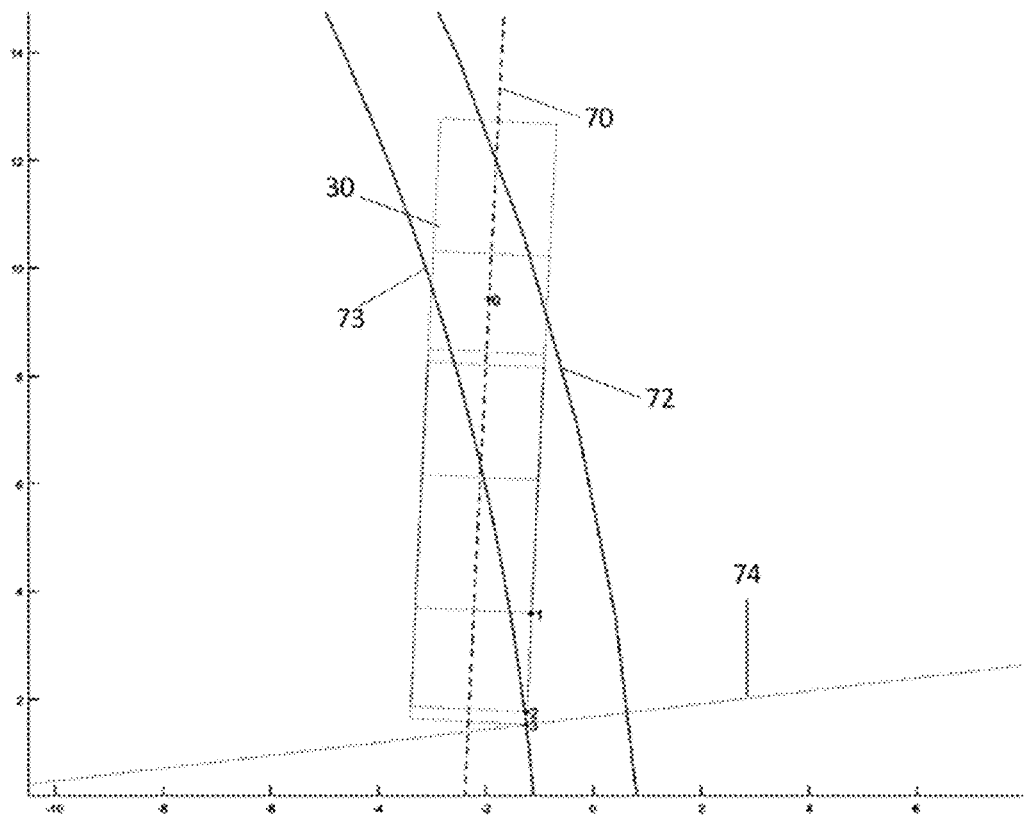
FIG. 8 shows a schematic illustration of an object trajectory and a vehicle trajectory according to one or more embodiments.

Optionally, at step P6, a single trajectory of the object and the vehicle are calculated and compared to see if the trajectories overlap in space. If they intersect then the method proceeds to step P8 or P10. FIG. 8 illustrates such a comparison. The expected trajectory of the vehicle 10 is calculated (i.e. taking the parameters for speed, turn rate and acceleration measured by the vehicle system), using a CTCA model. The region occupied by the vehicle along the expected trajectory, is calculated. As shown in FIG. 8, the region occupied by the vehicle along the expected trajectory include an annular region defined by outer arc 72 and inner arc 73. An expected trajectory of the object 30 is also calculated using the values measured by the sensors. If the object 30 (modelled with a bounding box containing the object) overlaps the space between arcs 72 and 73, then the method proceeds to step P8 or P10, otherwise the object is discarded. Steps P6 and P7 restrict the more computationally intensive collision calculations, described above with reference to FIG. 3, to objects which are likely to be within proximity of the vehicle in the prediction horizon. This increases the efficiency of the algorithm.

Optionally, at step P8, a preliminary collision calculation is performed for the expected trajectory of the object and the vehicle. Any suitable method for determining whether a collision occurs may be performed. For example, the vehicle and object may be modelled as bounding boxes which completely contain the vehicle and object, respectively, for example the bounding box B shown in FIG. 1A. The positions and orientations of the bounding boxes may be iteratively calculated along the trajectories at each time step in the iteration (i.e. using Newton's method, taking the values of curve, tangential velocity, acceleration and jerk as input values), and at each iteration it may be calculated whether the bounding boxes are closer than a predetermined distance, and if so, return a positive result for the collision calculation. If the preliminary collision calculation returns a positive result (P9, i.e. that the object and vehicle are to be (e.g., will be) less than a predetermined distance from each other), then the method proceeds to step P10, otherwise the object is discarded. Steps P8 and P9 further restrict the more computationally intensive collision calculations, described above with reference to FIG. 3, to objects which are currently on a collision course with the vehicle. This further increases the efficiency of the algorithm.

At step P10, a first collision calculation is performed for different combinations of possible vehicle and object trajectories (i.e. steps S2 to S4 are performed for the object and vehicle), wherein the vehicle and object trajectories are bound by a first confidence interval. The vehicle and object trajectories selected may be the same as disclosed above in relation to method 100 (i.e. may be the left/right-most and fastest/slowest scenarios for the confidence interval). If the collision calculation indicates that the object and vehicle are to be closer than a predetermined distance for a predetermined number of trajectory combinations (P11, e.g. all combinations), the method proceeds to step P12 or P14. Otherwise the object is discarded.

Optionally, at step P12, a braking vehicle trajectory may be calculated wherein the vehicle maintains the curvature of the expected trajectory (i.e. the turn rate) and additionally brakes the vehicle. A collision calculation may then be performed once again for the braking vehicle trajectory and each of one or more of the object trajectories. The collision calculation may be any of the methods for calculating a collision disclosed herein.

Figure 7:
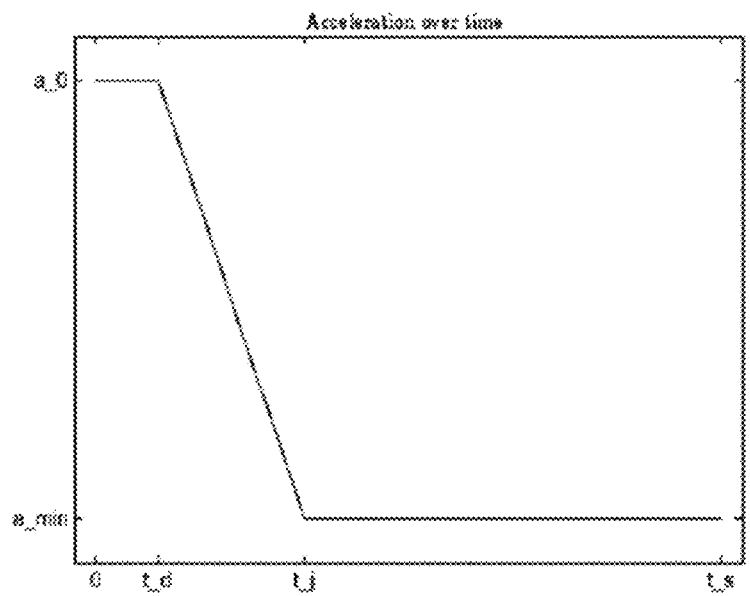
FIG. 7 shows a braking model according to one or more embodiments.

FIG. 7 shows a braking model for use in modelling deceleration of the vehicle in the braking vehicle trajectory. The braking dynamic of the vehicle can be calculated using three segments: an initial delay, a brake slope with maximum jerk and a constant maximum brake. In FIG. 7, the value a_0 is the vehicle acceleration at the start of the trajectory calculation; a_min is the maximum deceleration (minimum acceleration) that can be achieved by the vehicle; t_d is the initial delay (which models human reaction time); t_j is the time maximum deceleration is achieved, and is calculated from $$t_j = \frac{a\_min - a\_0}{j\_max}$$

Where j_max is the maximum jerk that the system can produce.

In one embodiment, the collision calculation for step P12 is performed by iteratively calculating the relative range rate between the object and vehicle along the trajectories until a time t_s where the range rate is zero (i.e. the object and vehicle are no longer approaching each other), and integrating the range rate up to the time t_s to calculate the relative distance moved between the object and vehicle over the trajectory. The relative distance moved is compared to the initial range of the object (i.e. at time zero of the trajectories), and if the difference is less than a predetermined safety margin, a positive result is given.

If the object is oncoming, then it is not possible to reach zero range rate by braking. In that case, the braking distance of the vehicle is compared to the closest point along the vehicle trajectory that the target is crossing, which is determined iteratively. This is indicated in FIG. 8. The process is initiated at the point along the object trajectory where the center of the object trajectory (center line 70) crosses the center of the vehicle trajectory (indicated by point 0). If the centers do not cross, then the start point is the point where the center of the object trajectory is closest to the center of the vehicle trajectory. The object is positioned at point 0 and is modelled as a bounding box. From this starting point, the corner of the object closest to the start of the vehicle trajectory is selected. The point at which the corner is closest to the start if the vehicle trajectory is then calculated by iterative step changes in the object trajectory (indicated by points 1, 2 and 3). The braking distance is then compared to the distance along the trajectory to this closest point (indicated by line 74), and if the difference is less than the predetermined distance, a positive result is given.

If a positive result is found (P13), then a first collision-avoidance process is initiated (P14). The method then proceeds to step P15 or P25.

Optionally, at step P15, a second collision calculation is performed for different combinations of possible vehicle and object trajectories. The collision calculation may be the same as for step P10, except the second confidence interval of the second collision calculation is greater than the first confidence interval. If the collision calculation indicates that the object and vehicle are to be closer than a predetermined distance for a predetermined number of trajectory combinations (P16, e.g. all combinations), the method proceeds to step P17 or P19. Otherwise the object is discarded.

Optionally, at step P17, a braking vehicle trajectory may be calculated wherein the vehicle maintains the curvature of the expected trajectory (i.e. the turn rate) and additionally brakes the vehicle. A collision calculation may then be performed once again for the braking vehicle trajectory and each of one or more of the object trajectories. The collision calculation may be any of the methods for calculating a collision disclosed herein (including that described in step P12). The braking model used for step P17 may vary from the braking model used in P11. For example, t_d may be reduced if the first collision mitigation process is a collision warning, as this may increase the driver's awareness and therefore shorten the reaction time of the driver. If a positive result is given (P18), then a second collision-avoidance process is initiated (P19). The method then proceeds to step P20 or P25.

Optionally, at step P20, a third collision calculation is performed for different combinations of possible vehicle and object trajectories. The collision calculation may be the same as for step P10 and P15, except the third confidence interval of the third collision calculation is greater than the second confidence interval. If the collision calculation indicates that the object and vehicle are to be closer than a predetermined distance for a predetermined number of trajectory combinations (P21, e.g. all combinations), the method proceeds to step P22 or P24. Otherwise the object is discarded.

Optionally, at step P22, a braking vehicle trajectory may be calculated wherein the vehicle maintains the curvature of the expected trajectory (i.e. the turn rate) and additionally brakes the vehicle. A collision calculation may then be performed once again for the braking vehicle trajectory and each of one or more of the object trajectories. The collision calculation may be any of the methods for calculating a collision disclosed herein (including that described in step P12). The braking model used for step P22 may vary from the braking model used in P11 and P17. If a positive result is given (P23), then a third collision-avoidance process is initiated (P24). The method then proceeds to step P25.

At step P25, it is checked whether there are further objects which have not been analyzed for a collision prediction. If so, the next object is selected. If not, the process ends.

The first, second and third collision-mitigation processes may be selected to increase in severity (i.e. increase the level of intervention provided by the ADAS. For instance, the first process may be a collision warning, the second process may be a brake assist and/or pre-brake process (i.e. they may be activated in parallel) and the third process may be an emergency braking process. As the confidence interval used increases for each iteration, the first collision-mitigation process is activated in a wider set of scenarios than the second collision-mitigation process, which in turn activates in a wider set of scenarios than the third collision-mitigation process.

Figure 9:
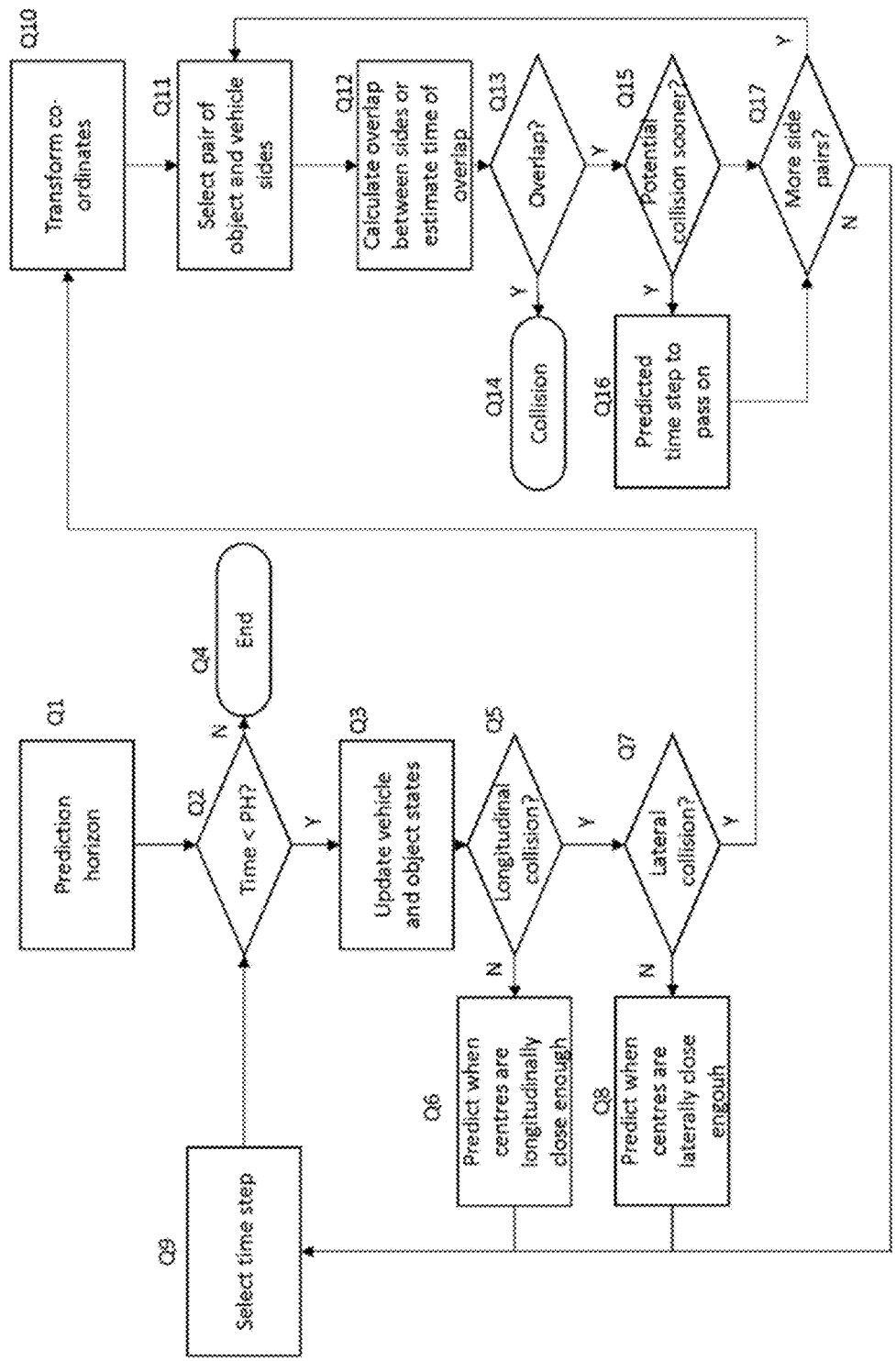
FIG. 9 shows a method for performing a collision calculation.

FIG. 9 shows a method for performing a collision calculation according to one or more embodiments of the disclosure. The method takes the initial parameters describing the motion of the object and the vehicle (e.g. tangential velocity, acceleration, jerk and turn rate) and calculates the trajectories of the object and vehicle by iterations, wherein in each iteration the velocity of the object and vehicle is constant (Newton's method). The method further models the object and vehicle by bounding boxes which are dimensioned to contain the object and vehicle, respectively.

At step Q1, the time period, or prediction horizon over which the iterative method is to calculate the trajectories, is determined. This may be a predetermined time period such as between 2 to 5 seconds, for example 3.5 seconds. The maximum time step for each iteration is also selected. For example, the maximum time step may be 1 second or less.

At step Q2, it is determined whether the time of the iteration is smaller than the prediction horizon time. If it is not, the process ends (Q4) as the time of the iteration is beyond the maximum time period of the calculation.

At step Q3, the vehicle and object states (position, heading) are updated based on the motion parameters.

At step Q5, it is determined whether the centers of the bounding boxes have a longitudinal separation such that it is possible that the bounding boxes could be closer than a predetermined distance. The longitudinal direction is taken to be the direction of travel of the vehicle during the iteration time (i.e. the Y direction shown in FIG. 1A). If not, then the time until the centers are longitudinally close enough is predicted based on the velocity of the object and vehicle in the current iteration (Q6). If the predicted time until they are longitudinally close enough is less than the maximum time step, this smaller time step is selected for the next iteration (Q9). It is noted that a negative time step may also be taken so long as it does not iterate to before a point in time already evaluated.

If it is determined that longitudinal collision is possible, then in step Q7 it is determined whether the centers of the bounding boxes have a lateral separation such that it is possible that the bounding boxes could be closer than a predetermined distance. The lateral direction is taken to be perpendicular direction of travel the vehicle during the iteration time (i.e. the X direction shown in FIG. 1A). If not, then the time until the centers are laterally close enough is predicted based on the velocity of the object and vehicle in the current iteration (Q8). If the predicted time until they are longitudinally close enough is less than the maximum time step, this smaller time step is selected for the next iteration (Q9). Again, a negative time step may also be taken so long as it does not iterate to before a point in time already evaluated.

If it is determined that lateral collision is possible, then in step Q10, optionally, the coordinate system is transformed to only have relative movement between the object and the vehicle in one dimension (assuming constant velocity in the iteration). Transforming to such a coordinate system makes easier the collision calculation between a pair of object sides, as the time to collision can be calculated by divided the distance to collision by the relative velocity between the sides.

In step Q11 a pair of object and vehicle sides (i.e. sides of the bounding boxes) are selected. For the pair of sides, it is determined whether they are closer than a predetermined distance from one another (Q12). If so, (Q13) a collision result is output (Q14) and the process ends.

If they are not found to be closer than the predetermined distance, the time until they are is estimated using the current relative velocity (Q11). If the predicted time until collision is the soonest for all of the combinations of pairs analyzed in step Q11 so far (Q15), this time is selected as the next time step (Q16) (again the time step must be smaller than the maximum time step and must not iterate to before a point in time already evaluated).

If there are more combinations of object and vehicle side pairs to analyze (Q17), then a new pair of sides are selected at step Q11 and steps Q12 to Q17 are repeated until all pairs have been analyzed.

The process continues until a collision is found or the iteration time is greater than the prediction horizon time.

Figure 10:
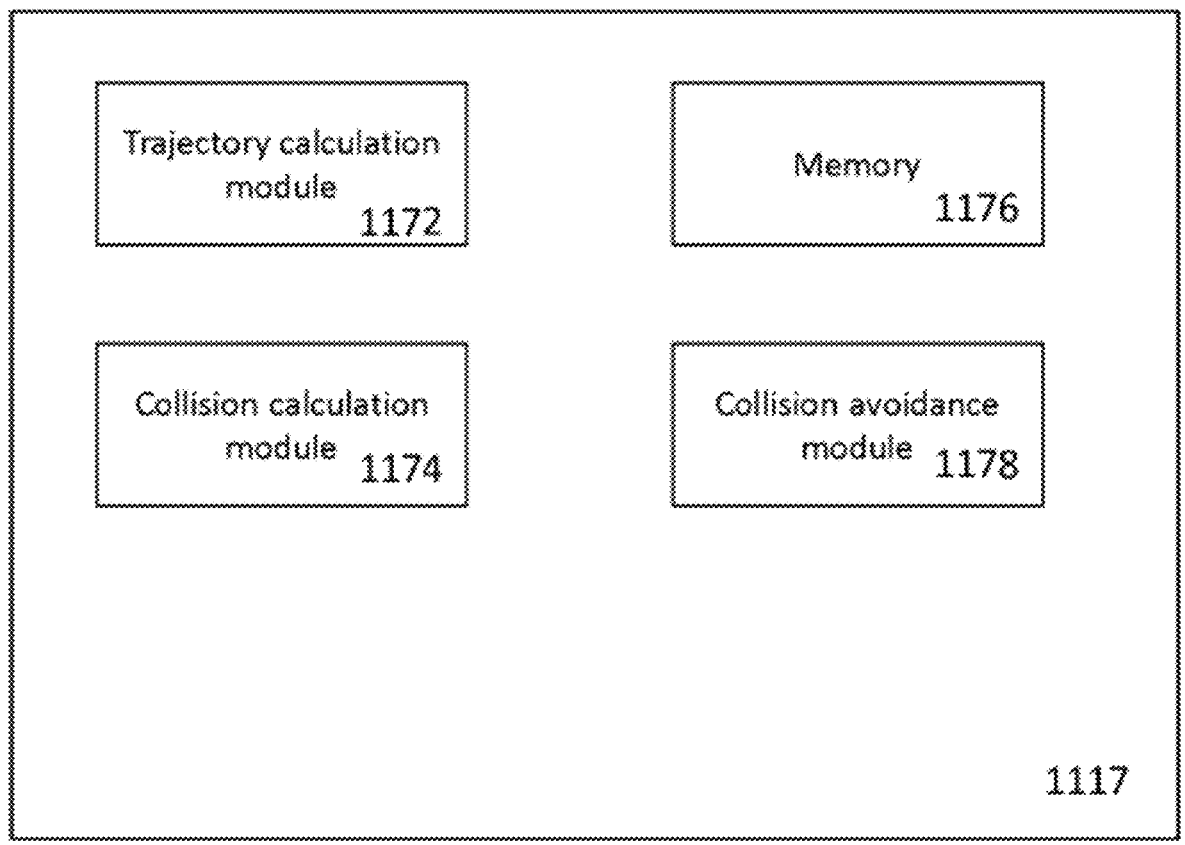
FIG. 10 shows a schematic block diagram of a decision module according to one or more embodiments.

FIG. 10 shows a decision module 1117 for implementing the methods disclosed herein, which may include software and/or hardware. The decision module may include a trajectory calculation module 1172, a collision calculation module 1174, a memory 1176 and a collision avoidance module 1178. The trajectory calculation module 1172 is configured to perform trajectory calculations for the object and the vehicle disclosed herein. The collision calculation module 1174 is configured to receive the trajectories calculated by the trajectory calculation module 1172 and to perform the collision calculations as disclosed herein. The collision avoidance module 1178 is configured to receive the output of the collision calculation module 1174 and to issue commands to vehicle controller V for initiating collision mitigation processes. Memory 1176 may contain any suitable data for performing the methods disclosed herein, such as any predetermined parameters used to calculate the trajectories or collisions.

Accordingly, the present disclosure provides a method for reliably predicting collisions which take into account different possible scenarios of the vehicle and moving objects which are detected around the vehicle.

It is noted that in whilst the steps of the methods disclosed herein are given in a particular order, the steps need not be performed in the chronological sequence presented unless a particular step is dependent upon the result of a prior step.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments, or defined only in accordance with the following claims and their equivalents.

While this specification contains many specific embodiment details, these should not be construed as limitations on the scope of any disclosures or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

What is claimed is:

1. A computer-implemented method comprising:
a) acquiring information about one or more moving objects in surroundings of a vehicle, the information comprising:
a range rate of each of the objects; and
a heading of each of the objects;
b) calculating one or more possible vehicle trajectories of the vehicle;
c) for each object, calculating:
a plurality of possible object trajectories of the object from the range rate of the object;
the heading of the object; and
at least one of a possible turn or acceleration of the object, the possible turn or acceleration values of the object differing for each possible object trajectory and bound by a predetermined first confidence interval for the turn or acceleration values;
d) for each combination of calculated vehicle trajectory and possible object trajectory, performing a collision calculation to calculate whether the vehicle and object are to be closer than a predetermined minimum distance to each other; and
e) determining if, for one or more of the objects, at least a predetermined number of collision calculations indicate the vehicle and object are to be closer than the predetermined minimum distance to each other.

2. The method of claim 1, wherein the plurality of possible object trajectories includes at least one of:
a fast leftward trajectory wherein the object travels leftward of its expected trajectory in a left-most and fastest scenario in the first confidence interval;
a slow leftward trajectory wherein the object travels leftward of its expected trajectory in a left-most and slowest scenario in the first confidence interval;
a fast rightward trajectory wherein the object travels rightward of its expected trajectory in a right-most and fastest scenario in the first confidence interval; or
a slow rightward trajectory wherein the object travels rightward of its expected trajectory in a right-most and slowest scenario in the first confidence interval.

3. The method of claim 1, wherein the one or more possible vehicle trajectories includes:
a leftward trajectory wherein the vehicle is steered leftward of its expected trajectory; and
a rightward trajectory wherein the vehicle is steered rightward of its expected trajectory,
wherein the leftward and rightward trajectories represent a confidence interval of the vehicle trajectory.

4. The method of claim 1, wherein the predetermined number of collision calculations comprises all of the collision calculations for the object.

5. The method of claim 1, wherein the information about the one or more objects further comprises a classification of the object, wherein at least one of:
the plurality of possible object trajectories calculated are calculated based in part on the object classification; or
the predetermined minimum distance is selected based on the object classification.

6. The method of claim 1, further comprising:
f) initiating a collision-mitigation process if, for one or more of the objects, the predetermined number of collision calculations indicate the vehicle and object are to be closer than the predetermined minimum distance to each other.

7. The method of claim 6, wherein the collision-mitigation process comprises at least one of:

issuing a collision warning to a driver of the vehicle;
initiating a brake assist process;
initiating a pre-brake process; or
initiating an emergency braking process.

8. The method of claim 6,
wherein the method repeats the process of c) to f) one or more times iteratively, each iteration performed only if the collision-mitigation process of the previous iteration is initiated;
wherein each iteration calculates a plurality of object trajectories having at least one of turn or acceleration values lying within a confidence interval greater than the confidence interval of the previous iteration; and
wherein a collision-mitigation process of the iteration is initiated if, for one or more of the objects, at least a predetermined number of collision calculations indicate the vehicle and object are to be closer than the predetermined minimum distance to each other.

9. The method of claim 8, comprising three iterations:
wherein the collision-mitigation process of the first iteration is issuing a collision warning to a driver of the vehicle;
wherein the collision-mitigation process of the second iteration comprises at least one of initiating a brake assist process or initiating a pre-brake process; and
wherein the collision-mitigation process of the third iteration is initiating an emergency braking process.

10. The method of claim 6, wherein prior to initiating one or more collision-mitigation processes, the method further comprises:
g) calculating a braking vehicle trajectory modelling a scenario in which the vehicle maintains a curvature of the expected vehicle trajectory and brakes;
h) for the braking vehicle trajectory and each of one or more object trajectories, performing a collision calculation to calculate whether the vehicle and object are to be closer than the predetermined minimum distance to each other; and
i) responsive to calculating that the vehicle and object are to be closer than the predetermined minimum distance to each other, initiating the one or more collision-mitigation processes.

11. The method of claim 1,
wherein prior to step c), the method comprises, for each object:
calculating an expected trajectory of the object from the acquired information;
calculating an expected trajectory of the vehicle; and
determining whether the expected trajectories overlap,
wherein step c) is only performed for those objects whose expected trajectory crosses the expected trajectory of the vehicle.

12. The method of claim 1, further comprising:
performing a preliminary collision calculation to calculate whether the vehicle and object are to be closer than a predetermined minimum distance to each other along their expected trajectories,
wherein step c) is only performed for those objects that are predicted to be closer than the predetermined minimum distance to the vehicle in the preliminary collision calculation.

13. The method of claim 12, wherein the preliminary collision calculation comprises:
calculating bounding boxes for the vehicle and object, the bounding boxes containing the vehicle and object, respectively;
calculating a longitudinal distance between centers of the bounding boxes at one or more time instances;
calculating a lateral distance between the centers of the bounding boxes at the one or more time instances; and
when the longitudinal distance and lateral distance indicate that the bounding boxes are to be closer than the predetermined minimum distance, determining whether the bounding boxes are closer than the predetermined minimum distance.

14. The method of claim 1, wherein the collision calculation comprises:
calculating bounding boxes for the vehicle and object, the bounding boxes containing the vehicle and object, respectively;
calculating a longitudinal distance between centers of the bounding boxes at one or more time instances;
calculating a lateral distance between the centers of the bounding boxes at the one or more time instances; and
when the longitudinal distance and lateral distance indicate that the bounding boxes are to be closer than the predetermined minimum distance, determining whether the bounding boxes are closer than the predetermined minimum distance.

15. An apparatus comprising:
a processor configured to execute operations comprising:
a) acquire information about one or more moving objects in surroundings of a vehicle, the information comprising:
a range rate of each of the objects; and
a heading of each of the objects;
b) calculate one or more possible vehicle trajectories of the vehicle;
c) for each object, calculate:
a plurality of possible object trajectories of the object from the range rate of the object;
the heading of the object; and
at least one of a possible turn or acceleration of the object, the possible turn or acceleration values for the object differing for each possible object trajectory and bound by a predetermined first confidence interval for the turn or acceleration values;
d) for each combination of calculated vehicle trajectory and possible object trajectory, perform a collision calculation to calculate whether the vehicle and object are to be closer than a predetermined minimum distance to each other; and
e) determine if, for one or more of the objects, at least a predetermined number of collision calculations indicate the vehicle and object are to be closer than the predetermined minimum distance to each other.

16. The apparatus of claim 15, wherein the operation of calculate the plurality of possible object trajectories further comprises the processor configured to execute least one operation comprising:
calculate a fast leftward trajectory wherein the object travels leftward of its expected trajectory in a left-most and fastest scenario in the first confidence interval;
calculate a slow leftward trajectory wherein the object travels leftward of its expected trajectory in a left-most and slowest scenario in the first confidence interval;
calculate a fast rightward trajectory wherein the object travels rightward of its expected trajectory in a right-most and fastest scenario in the first confidence interval; or calculate a slow rightward trajectory wherein the object travels rightward of its expected trajectory in a rightmost and slowest scenario in the first confidence interval.

17. The apparatus of claim 15, wherein the operation of calculate one or more possible vehicle trajectories of the vehicle further comprises the processor configured to execute at least one operation comprising:
 calculate one or more possible vehicle trajectories that includes a leftward trajectory wherein the vehicle is steered leftward of its expected trajectory; and
 calculate one or more possible vehicle trajectories that includes a rightward trajectory wherein the vehicle is steered rightward of its expected trajectory,
 wherein the leftward and rightward trajectories represent a confidence interval of the vehicle trajectory.

18. The apparatus of claim 15, wherein the operation of determine if, for one or more of the objects, at least a predetermined number of collision calculations indicate the vehicle and object are to be closer than the predetermined minimum distance to each other further comprises:
 determine if the predetermined number of collision calculations comprises all of the collision calculations for the object.

19. The apparatus of claim 15, wherein the operation of acquire information about one or more moving objects in the surroundings of the vehicle further comprises at least one of:
 acquire information about a classification of the object, wherein the operation of calculate, for each object, a plurality of possible object trajectories of the object further comprises:
  calculate the plurality of possible object trajectories based in part on the object classification; or
 acquire information about a classification of the object, wherein the operation of perform a collision calculation to calculate whether the vehicle and object are to be closer than a predetermined minimum distance to each other further comprises:
  select the predetermined distance based on the object classification.

20. The apparatus of claim 15, wherein the processor is configured to execute operations further comprising:
 f) initiate a collision-mitigation process if, for one or more of the objects, a predetermined number of collision calculations indicate the vehicle and object are to be closer than the predetermined minimum distance to each other.

* * * * *